May 25, 1937.  W. MELAS  2,081,596
MANOMETER CALIBRATING MEANS
Original Filed April 2, 1934   2 Sheets-Sheet 1

Inventor
William Melas
By Cornelius D. Ehret
His Attorney

May 25, 1937.  W. MELAS  2,081,596
MANOMETER CALIBRATING MEANS
Original Filed April 2, 1934  2 Sheets-Sheet 2
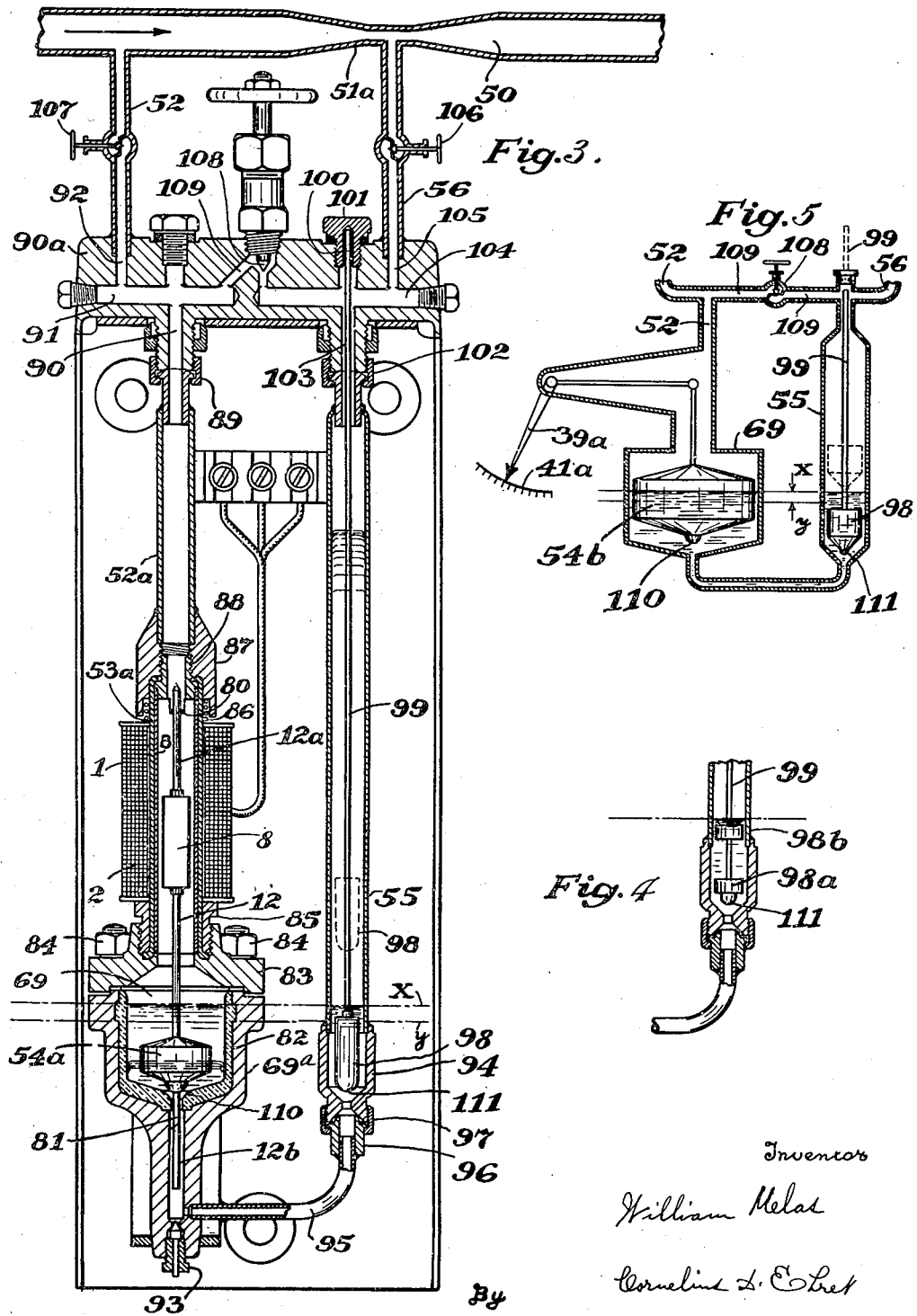

Patented May 25, 1937

2,081,596

UNITED STATES PATENT OFFICE 2,081,596

MANOMETER CALIBRATING MEANS

William Melas, Bala-Cynwyd, Pa., assignor to Cochrane Corporation, Philadelphia, Pa., a corporation of Pennsylvania Original application April 2, 1934, Serial No. 718,641. Divided and this application March 8, 1935, Serial No. 9,930

9 Claims. (Cl. 73—31)

My invention relates to fluid measuring apparatus, more particularly to manometers across the respective legs of which differing relative pressures are produced in accord with the rate of flow of the fluid under measurement, and has for an object the provision of an accurate, inexpensive and reliable means for checking the calibration of the manometer.

Further in accord with my invention a liquid displacer is normally maintained below the level of the liquid contained in one of the manometer legs or chambers, a float in the other of the legs or chambers indicating changes in liquid level therein in accord with the differential pressures produced by and representative of the flow of fluid under measurement. To check the calibration, valves are closed to isolate the manometer from the fluid whose rate of flow is to be measured, the pressures upon the respective legs or chambers are equalized, and the displacer is moved to a position above the level of the manometer liquid. The resultant change in position of the float is then measured, and, if the change is not in accord with a factory-determined value, the extent of the error in calibration will be indicated and the error may then be corrected.

This application is a division of my application Serial No. 718,641 filed April 2, 1934, which in turn is a continuation-in-part of my application Serial No. 579,944, filed December 9, 1931, now Letters Patent No. 2,010,554, granted August 6, 1935.

For a more complete understanding of my invention and for illustration of apparatus and systems embodying it, reference is to be had to the accompanying drawings, in which:

Fig. 3 is a front elevational view with parts in section of a flow-meter for use in the system of Fig. 2 having a calibrating displacer element;

Fig. 4 is a detail view showing a modified form of displacer element;

Fig. 5 illustrates another type of flowmeter provided with a calibrating displacer element.

Figure 1:
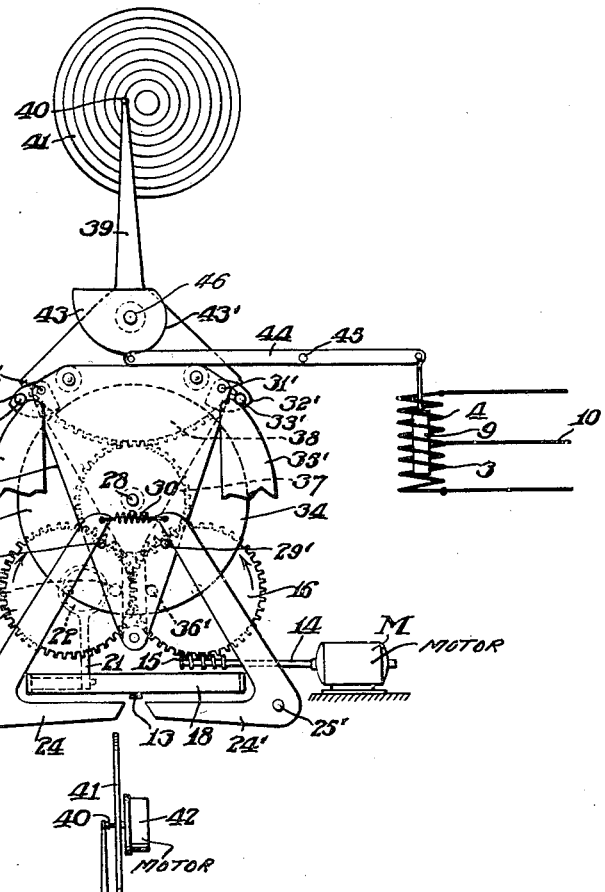
Fig. 1 is a schematic front elevational view of a mechanical relay and recorder.
Figure 2:
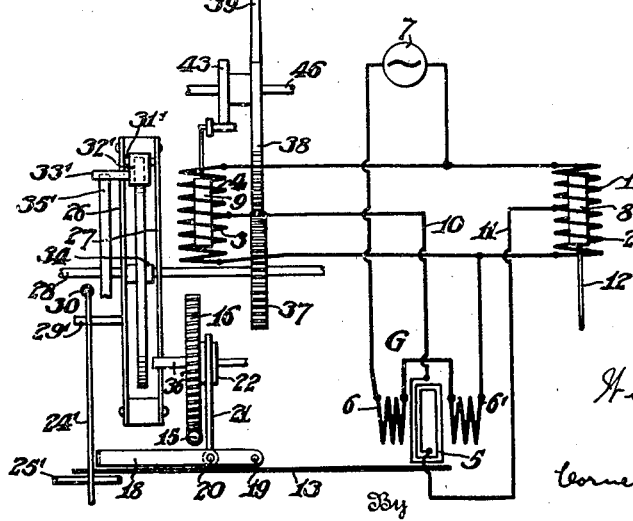
Fig. 2 is a side elevational view of the relay of Fig. 1 and a circuit diagram of a network employed therewith.

Referring particularly to Figs. 1 and 2, a measuring bridge of the inductance type comprises inductance coils 1, 2, 3 and 4, preferably wound on non-magnetic spools (not shown). One end of each coil is connected, as shown, to the movable coil 5 of an alternating current galvanometer G or other sensitive current detecting instrument. Coils 6 and 6' comprise the field of the galvanometer, and are connected in circuit with inductance coils 1, 2 and 3, 4 and a source 7 of alternating current. Coils 1 and 2 have a movable core or plunger 8 of magnetizable material, the position of the core within the coils determining their relative inductance, and therefore their relative impedance. The coils 3, 4 have a similar core or plunger 9 of magnetizable material, the position of which determines the relative impedance of the coils. The position of plunger 8, relative to the coils 1 and 2 is caused to vary in accordance with the magnitude, or variation in magnitude, from a predetermined value, of the quantity or condition to be measured, by a rod 12, preferably of non-magnetizable material, secured to a member movable from its normal position in response to said quantity or magnitude, in the manner illustrated in Fig. 5.

The inductance coils 1, 2, 3, 4 and the galvanometer G comprise a Wheatstone bridge circuit, supplied with alternating current from the source 7, the relative positions of the cores 8 and 9 determining a balanced or unbalanced condition of the bridge, as the case may be. The relative impedances of the coils 1 and 2 are dependent upon the position of core 8, and if the core 9 is in the same relative position in coils 3 and 4, the bridge is balanced and no current will flow through the galvanometer coil 5, and therefore its pointer or needle 13, attached to and carried by the movable coil 5, will remain in the mid-position, Fig. 1, to which it is normally biased by means of control springs or filaments (not shown) attached to the galvanometer.

When core 8 is moved within coils 1 and 2, their relative inductance is changed and the bridge is electrically unbalanced, so that current will flow through the galvanometer coil 5 and cause it and pointer 13 to deflect to one side or the other of its mid-position, dependent upon the direction of movement or displacement of the core 8, and by an amount proportional to the amount of displacement of the core. The pointer 13 controls mechanical relay mechanism to move the core 9 in a direction and by an amount which will restore the balance of the bridge in the following manner:

Assume, for example, that core 8 has been displaced upwardly, and has thereby caused the pointer 13 to deflect to the left, as viewed in Fig. 1. A source of power comprising a motor M, which is continuously driven at constant speed, either by direct or alternating current, as source 7, rotates the shaft 14 carrying worm gear 15. The worm gear rotates gear 16 which meshes with a similar gear 17, the gear 16 rotating in a counter-clockwise direction, and gear 17 rotating in a clockwise direction, as viewed in Fig. 1. A U-shaped depressor bar 18 is pivoted at 19, and is alternately raised and depressed, at intervals of a second or two, by means of pivot pin 20, eccentric lever 21, and eccentric 22 attached to the gear 17. In the position shown in Fig. 1, the bar 18 is at that portion of its stroke which permits free swing or lateral movement of the galvanometer pointer 13, and the pointer is therefore free to deflect, as to the left, between the lower surface of bar 18 and the upper surface of left-hand bell crank lever 24. Immediately following the interval in which the galvanometer is allowed to deflect, the bar 18 is depressed, and the pointer 13 is clamped between the bar and the lever 24 at a point which represents the extent of its deflection. The bell crank lever 24 is pivoted at 25, and is adapted to rotate in a clockwise direction about its pivotal point until the bar 18 reaches the bottom of its stroke. In so doing, it will rotate the yoke assembly comprising plates 26 and 27 in a counter-clockwise direction about a shaft 28 by reason of the contact of the bell crank lever with pin 29 secured to and extending from plate 26. It will be seen that, for small deflections, the pointer will engage the bell crank lever at a point far from the pivotal point 25, and for large deflections the lever is engaged at a point near the pivotal point. Therefore, the greater the galvanometer deflection, the greater the deflection of the bell crank lever and yoke assembly. A second bell crank lever 24' is adapted to be actuated in a counter-clockwise direction, when the pointer 13 is deflected to the right, for actuating the relay structure in a corresponding direction. A tension spring 30 serves to keep the bell crank levers in contact with pins 29 and 29', respectively.

The yoke assembly carries at its upper end, by means of pivots 31 and 31', the pawls 32 and 32', respectively, each pawl being eccentrically mounted with respect to a clutch wheel 34 for the purpose hereinafter disclosed. Pins 33 and 33' secured to and extending from the pawls serve to keep one or the other of the pawls out of engagement with the clutch wheel 34, to prevent rotation of the wheel in the wrong direction, by engagement of the pins with the outer edges of fixed members or cams 35 and 35' (shown broken away), the edges comprising arcs having their centers coincident with the axis of rotation 28 of the yoke assembly. Since the yoke assembly has now been moved in a counter-clockwise direction, the pawl 32 is out of engagement with the clutch wheel 34 because its pin 33 rides on the surface of cam member 35 for the duration of this movement, but pawl 32' has been brought into engagement with the clutch wheel 34, although it does not rotate the wheel during counter-clockwise movement because the shape of the pawl and its position with respect to the clutch wheel cause the pawl to rotate counter-clockwise to an extent sufficient to permit its travel over the surface of the wheel.

After rotation to an extent dependent upon the amount of deflection of the pointer 13, the yoke assembly is brought back to its normal or mid-position by a stud or pin 36' carried by and extending from the rotating gear 16, the pin engaging an edge of the plate 27, shown in dotted lines in Fig. 1, which forms the back plate of the yoke assembly. In thus returning to the mid-position, the pawl 32' is rotated in a clockwise direction by its contact with the clutch wheel 34, and due to the eccentric mounting of the pawl, its rounded surface will roll into wedging engagement with the clutch wheel, and therefore the pawl carries with it the clutch wheel which, through shaft 28, rotates gear 37 which engages a sector 38 pivotally mounted at 46. If desired, the clutch wheel may have serrations or teeth, and each pawl adapted to ratchet over the serrations when it is carried in one direction by the yoke assembly, and to engage the serrations during return of the assembly to normal position.

The sector 38 carries an arm 39, and a marker or stylus pen 40 which bears upon a record or chart 41 rotated by clockwork mechanism 42, a synchronous motor or equivalent, thus giving a graphic record of the variations in movement of the core member 8.

The sector 38 also carries cam member 43 co-pivotally mounted therewith, having a camming surface 43' which engages one end of lever 44 pivotally mounted at 45, the other end of the lever causing a displacement of core 9 in coils 3 and 4 in accordance with movement of the cam member. When the core 9 has been displaced by an amount equal to the displacement of the core 8, the bridge will be re-balanced and galvanometer pointer 13 will return to its mid-position, at which time depression of the bar 18 will cause no movement of the bell crank members or clutch mechanism. The camming surface 43' may be shaped so that the relation of the recording pen 40 with respect to movement of the core 8 will follow any desired law.

The foregoing arrangement provides a recorder having high sensitivity and extreme accuracy, because the slightest condition of unbalance of the bridge circuit is detected by a sensitive instrument, as the galvanometer shown. Since no moving contacts are required in the measuring circuit, the recorder is free from error due to variable contact resistance. The position and movement of the recorder and the core 9 is obtained by relay mechanism powered independently of the measuring circuit, and the system is therefore free from errors caused by friction of parts in the recorder. In the systems illustrated in Figs. 1 and 2, each of the core members 8 and 9 is in a balanced magnetic field except when a condition of unbalance obtains in the bridge circuit, and this increases the sensitivity and accuracy of the system because no magnetic attraction on either core is required to be overcome before effecting movement of the core in response to a change in said quantity or condition.

In the foregoing, the cores 8 and 9 are referred to as the movable elements, but it will be understood that, in various arrangements, either of them may be stationary, and the inductance coils movable, since it is the relative movement between them that varies the inductance and, hence, the relative impedances of the arms of the bridge circuit.

In Fig. 3 is shown the details of construction of a commercial form of manometer constructed in accordance with my invention and including the calibration checking means, the parts of which are illustrated in positions preparatory to checking the calibration. So far as possible, like reference characters identify parts corresponding to parts having the same function in preceding and subsequent figures. The venturi 51a in pipe 50 produces a difference between the pressures on the mercury in the respective legs of the manometer. Thus the high pressure leg comprises tube 53a which communicates with the upper part of chamber 69 and is secured to tube 52a, itself communicating with passages 90 and 91 provided in the block 90a. The passages 90, 91, and 92 in the block 90a cooperate with tube 52 to complete the connection to the high pressure side of the venturi 51a. Similarly the low pressure leg extends from the low pressure side of the manometer by tube 56, passages 105, 104 and 103 of block 90a and by tube 55 to the upper portion of chamber 94. The movement of float 54a in response to variation of the mercury level in chamber 69 is imparted to the core 8 by the shaft 12, as in Fig. 2. The extensions 12a, 12b cooperate with the guide bracket 80 and the aperture 81 to prevent the core from tilting against the tube 53a which may, as shown, have a liner B of Bakelite, or like material, resistant to chemical action of the fluid above the mercury. The tube 53a may be of copper or other metal or alloy of low specific resistance, for example not greater than 30 micro-ohms per centimeter cubic. It is not necessary that the walls of the tube be thin and/or that the clearance between the core 8 and the inside of tube 53a be small. Within reasonable limits, the thickness of the tube may be selected to afford the desired mechanical strength for the particular range of pressures the tube is expected to withstand in use; for high pressure work, for example, involving steam or working pressures of the order of 1,000 lbs. per square inch, the tube 53a will necessarily be of substantial thickness but without appreciable loss of sensitivity or accuracy in the electrical system inasmuch as the sensitive galvanometer and mechanical relay respond to minute unbalances of the network. In brief, because the electrical system is not called upon to do substantial work, such as moving and maintaining the position of the second core 9, the thickness of the tube 53a may be relatively large, its specific electrical resistance may be low, and the gap between core 8 and inner layer of the coil winding may be large, and large enough to accommodate a tube lining, when necessary, whose thickness is substantial and sufficient to withstand high pressure. The lack of need to have only slight clearance between the core and the inside of the tube simplifies the manufacture and reduces the cost of the instrument while retaining high accuracy and sensitivity. The chamber 69 may be provided with a lining 82 of Bakelite or other similar material chemically inert to the mercury.

The cap 83 forming the top of, and secured to housing 69a, as by nuts 84, threadedly receives the member 85 which clamps and seals the lower end of tube 53a and provides a support for the coils 1, 2, encircling the tube. The spring 86, which bears against the upper end of the coil assembly is received by a recess in the lower face of the member 87 which cooperates with plug 88 to clamp the upper end of tube 53a. Member 87 forms a continuation of the pipe 52a whose upper end is suitably held by the coupling member 89 to the block 90a provided with passages 90, 91, 92 for effecting communication between pipe 52 on the high pressure side of the venturi 51a and pipe 52 to the float chamber 69.

The lower end of chamber 69, which may be provided with a drain plug 93, is connected to the lower end of chamber 94 of the low-pressure leg of the manometer by tubing 95 and coupling members 96, 97. The displacer element 98 is held in chamber 94, in the position shown, the rod 99 extending upwardly therefrom through tube 55 and block 90a, being received by the blind hole 100 in the sealing plug 101.

The upper end of tube 55 is suitably held to block 90a as by the coupling 102 in communication with the passages 103, 104, 105, the latter opening into tube 56 which extends to the throat of the venturi 51a.

In normal use, the valves 106 and 107 in the pipes 56, 52 are open, and the valve 108 controlling the by-pass passage 109 is closed. This passage 109 provided by the block 90a extends between, and communicates with, the passages 91 and 104. When it is desired to check the calibration, valves 106 and 107 are closed and valve 108 opened. This equalizes the pressures in the legs of the manometer tubes, and the mercury level is the same in both, as illustrated by dot-dash line $x$. The plug 101 is then unscrewed and the displacer 98 lifted above the mercury, as indicated by the dotted line position. The mercury level thereupon falls to a position indicated by line $y$ and the position of core 8 thereupon corresponds to that obtaining when the rate of flow produces the same difference in level; that is, the displacer is calibrated to correspond to any desired value on the scale. If the difference between the readings from chart 41 does not correspond to a factory-determined value, an error will be indicated; such an error may be due to accumulation of dirt on the walls of chamber 69 which of course varies the volume of that chamber. To eliminate the error it is only necessary to clean the chamber.

To check the calibration at two points on the scale, the modified construction in Fig. 4 may be used. When the displacer 98b is lifted above the mercury, displacer 98a remaining therein, the pointer 39 should indicate one predetermined value, and when rod 99 is lifted higher, also to remove the displacer 98a, the pointer 39 should indicate a predetermined higher reading. The calibration may be checked at as many points as desired by providing a corresponding number of displacers; usually one or two points is sufficient.

To restore the instrument to use, rod 99 is depressed and plug 101 replaced. Then valves 106 and 107 are opened and valve 108 reclosed.

The rounded elements 110 and 111 at the bottom of the float and of the displacer serve as mercury check valves in the event that the instrument is reversely connected to pipe 50, or is subjected to pressures beyond its range.

Though this calibration feature of my invention is of particular value in the system of Figs. 1, 2, and 3, it can be utilized to advantage in other manometer arrangements; for example, as shown in Fig. 5, the float 54b may be mechanically connected to the indicator or marker 39a. With the pressures equalized on the manometer fluid columns in legs 55 and 69, a certain reading of pointer 39a and scale 41a is obtained with the displacer 98 out of the manometer fluid if the calibration is correct.

What I claim is:

1. Apparatus of the character described comprising interconnected chambers, structure responsive to change in level of liquid in one of said chambers, a pair of windings, a magnetic member mechanically connected to said structure to vary the impedances of said windings in accordance with changes of level of said liquid, characterized by the provision of calibration checking means comprising a displacer normally immersed below the level of said liquid and movable bodily above the level of said liquid to effect at least one predetermined change in level of said liquid and to effect corresponding changes in the impedances of said windings.

2. Apparatus of the character described comprising interconnected chambers subject respectively to pressures of different magnitude, structure responsive to change in level of liquid in one of said chambers, and calibration checking means comprising means to equalize the pressures in said chambers and a displacer to effect at least one predetermined change in level of said liquid.

3. The combination with apparatus of the character described comprising interconnected chambers subject respectively to pressures of different magnitude, structure responsive to change in level of liquid in one of said chambers, a pair of windings, a magnetic member mechanically connected to said structure to vary the impedances of said windings in accordance with changes of level of said liquid, of calibration checking means comprising means to equalize the pressure in said chambers and a displacer to effect at least one predetermined change in level of said liquid thereby to vary by predetermined amounts the impedances of said windings.

4. Apparatus of the character described comprising interconnected chambers, structure movable in response to change in level of liquid in one of said chambers, calibration checking means comprising a displacer normally immersed in the liquid in the other of said chambers and adapted to be lifted to effect at least one predetermined change in level of the liquid in the said first chamber, and a passageway for interconnecting said chambers above said liquid level to equalize the pressures in said chambers during operation of said calibration checking means.

5. Calibration checking means for a manometer having interconnected chambers and a member movable in one chamber in accordance with changes in the level of the manometer liquid comprising a displacer movable in the other chamber to positions above and below the liquid level to change by a predetermined amount the level of the manometer liquid in both of said chambers, an operating member having one end connected to said displacer and its opposite free end extending upwardly above the liquid level, a sealing plug normally cooperating with said free end to retain said displacer below said liquid level, means for equalizing the pressures in said chambers during calibration checking, and means for indicating the extent of movement of said first named member upon said change in the liquid level.

6. The combination with a manometer having high pressure and low pressure legs and including chambers interconnected below the level of manometer liquid, means for producing a differential pressure between said chambers to vary the liquid level in said chambers, structure movable in one of said chambers in response to changes in liquid level, an inductance coil, and means operable by said structure to vary the inductance of said coil in accordance with said changes in liquid level, of calibration checking means comprising a passageway interconnecting said manometer legs above the liquid level, valve means in said passageway movable to open said passageway and permit equalization of pressures in said legs and chambers, a displacer in the other of said chambers normally extending below the liquid level and including a rod substantially coextensive with the associated manometer leg, and a removable sealing plug cooperating with said rod to retain said displacer in a position extending below said liquid level, said plug when removed permitting movement of said rod and displacer above said liquid level to reduce by a predetermined amount the level of said liquid.

7. The combination with a manometer having liquid chambers interconnected by a passageway, means for producing a differential of pressure between said chambers to vary the liquid level therein, of calibration checking means comprising a displacer normally extending below the level of liquid and adapted by movement above the level of liquid to effect a predetermined change in level of the liquid, one end of said displacer cooperating to close said passageway upon a predetermined decrease in the level of the liquid in its associated chamber.

8. The combination with a manometer having high pressure and low pressure legs and including liquid chambers, a passageway interconnecting the chambers below the normal level of liquid, means for producing a differential pressure between said chambers to vary the liquid level therein, structure movable in one of said chambers in response to changes in liquid level, of calibration checking means comprising a passageway interconnecting said manometer legs intermediate the ends thereof, valve means in said passageway movable to open position to permit equalization of pressures in said legs and chambers, a displacer in the other of said chambers normally extending below the liquid level, one end of said displacer cooperating to close said liquid passageway upon a predetermined decrease in the level of the liquid, said displacer including a rod coextensive with the associated manometer leg, and removable means cooperating with said rod to retain said displacer below said liquid level, said means when removed permitting movement of said rod and displacer above said liquid level to reduce by a predetermined amount said liquid level.

9. The combination with a manometer having chambers interconnected by a liquid passageway, means for producing a differential of pressure between said chambers to vary the liquid level therein, a float within one of said chambers movable in accord with change of liquid level therein, of calibration checking means comprising a displacer normally maintained above the bottom of the other of said chambers and below the liquid level therein, means for moving said displacer above the liquid level to change by predetermined amounts the liquid levels in said chambers, and valve means associated with said passageway adapted to be closed by one end of said displacer upon a predetermined decrease in the level of the liquid in its associated chamber.

WILLIAM MELAS.